United States Patent [19]

Kucera

[11] Patent Number: 4,580,241
[45] Date of Patent: Apr. 1, 1986

[54] GRAPHIC WORD SPELLING CORRECTION USING AUTOMATED DICTIONARY COMPARISONS WITH PHONETIC SKELETONS

[75] Inventor: Henry Kucera, Providence, R.I.

[73] Assignee: Houghton Mifflin Company, Boston, Mass.

[21] Appl. No.: 467,834

[22] Filed: Feb. 18, 1983

[51] Int. Cl.[4] .......................... G06F 5/00; G06F 11/00; G06F 15/20
[52] U.S. Cl. ...................................... 364/900; 400/63; 400/83; 400/98; 434/167; 364/418
[58] Field of Search ... 364/200 MS File, 900 MS File, 364/300, 418; 381/41–44; 434/176, 178, 157, 167; 400/63, 83, 98, 100, 102, 109, 110

[56] References Cited

U.S. PATENT DOCUMENTS

| | | | |
|---|---|---|---|
| 3,568,156 | 3/1971 | Thompson | 364/300 |
| 3,704,345 | 11/1972 | Coker | 179/1 SM |
| 3,760,355 | 9/1973 | Bruckert | 340/146.2 |
| 3,969,698 | 7/1976 | Bollinger | 382/40 |
| 3,995,254 | 11/1976 | Rosenbaum | 340/146.3 WD |
| 4,010,445 | 3/1977 | Hoshino | 340/146.3 WD |
| 4,041,467 | 8/1977 | Cota | 364/900 |
| 4,068,301 | 1/1978 | Ishino | 364/200 |
| 4,096,934 | 6/1978 | Kirmser | 400/110 |
| 4,136,395 | 1/1979 | Kolpek et al. | 364/518 |
| 4,145,739 | 3/1979 | Dunning | 364/200 |
| 4,181,813 | 1/1980 | Marley | 179/1 SE |
| 4,270,182 | 5/1981 | Asija | 364/900 |
| 4,284,846 | 8/1981 | Marley | 179/1 SE |
| 4,342,085 | 7/1982 | Glickman | 364/300 |
| 4,355,302 | 10/1982 | Aldefeld | 340/146.3 Q |
| 4,355,371 | 10/1982 | Convis et al. | 364/900 |
| 4,383,307 | 5/1983 | Gibson, III | 364/900 |
| 4,400,828 | 8/1983 | Pirz | 382/30 |
| 4,471,459 | 9/1984 | Dickinson et al. | 364/900 |
| 4,484,305 | 11/1984 | Ho | 364/900 |
| 4,498,143 | 2/1985 | Strzelecki | 364/900 |
| 4,498,148 | 2/1985 | Glickman | 364/900 |

FOREIGN PATENT DOCUMENTS 2062916  5/1981  United Kingdom ............... 400/110

OTHER PUBLICATIONS

Dodds, D. J., "Reducing Dictionary Size by Using a Hashing Technique", Communications of the Association for Computing Machinery, vol. 25, No. 6 (1982), pp. 368–370.
Carter et al., "Exact and Approximate Membership Testers", Proceedings of the 10th Annual ACM Symposium (May 1978), pp. 59–65.
"Automatic Spelling Correction in Scientific and Scholarly Text," Joseph J. Pollock and Antonio Zamora, Communications of the ACM, Apr. 1984, vol. 27, No. 4, pp. 358–368.
"SPEEDCOP—Final Report," J. J. Pollock, Nov. 1981.
"System Design for Detection and Correction of Spelling Errors in Scientific and Scholarly Text," J. J. Pollock and A. Zamora, Journal of the American Society for Information Science, Mar. 1984, pp. 104–109.
"SPEEDCOP—TASK A.1: Quantification," J. J. Pollock, Jul. 1980.
"SPEEDCOP—Task A.3: Word Classification," K. A. Hamill, Jun. 1980.

(List continued on next page.)

Primary Examiner—James D. Thomas
Assistant Examiner—A. Williams
Attorney, Agent, or Firm—Lahive & Cockfield

[57] ABSTRACT

Automated spelling correction converts, by prescribed linguistic procedures, each word to be corrected to a skeleton, and compares that skeleton with a data base of skeletons derived by identical linguistic procedures from a dictionary of correctly spelled words. In the event of a match between the two skeletal terms, the correctly spelled word (or words) associated with the matched skeleton is presented for replacement of the misspelled word. In the event the comparison does not yield a correct match, the skeletal form of the misspelled word is repeatedly modified and each modified form is compared with the data base of skeletons.

20 Claims, 3 Drawing Figures

OTHER PUBLICATIONS

"SPEEDCOP—TASK A.3/TASK A.5: Trigram Overlap Between Automatically Derived Word Classes," Yelena M. Nayvelt, Nov. 1980.

"SPEEDCOP—Task A.4: Word Structure Analysis," K. A. Hamill and J. J. Pollock, Jan. 1981.

"SPEEDCOP—Task A.5: The Use of Trigrams for Spelling Error Detection," Y. M. Nayvelt, Oct. 1980.

"SPEEDCOP—Task B.1: Automatic Correction of Common Misspellings," J. J. Pollock, Oct. 1981.

"SPEEDCOP—Task C: Evaluation of Spelling Error Detection/Correction System," J. J. Pollock, Sep. 1981.

"Automatic Spelling Error Detection and Correction in Textual Databases," J. J. Pollock and A. Zamora, *International Interaction; Proceedings of the ASIS Annual Meeting*, vol. 19, Oct. 1982, pp. 236–238.

"Spelling Error Detection and Correction by Computer: Some Notes and a Bibliography," J. J. Pollock, *Journal of Documentation*, vol. 3, No. 48, Dec. 1982, pp. 282–291.

"Collection and Characterization of Spelling Errors in Scientific and Scholarly Text," J. J. Pollock and A. Zamora, *Journal of the American Society for Information Science*, Jan. 1983, pp. 51–58.

"The String-to-String Correction Problem," R. A. Wagner and M. J. Fischer, *Journal of the Association for Computing Machinery*, vol. 21, No. 1, Jan. 1974, pp. 168–173.

"The Use of Trigram Analysis for Spelling Error Detection," E. M. Zamora, J. J. Pollock and A. Zamora, *Information Processing & Management*, vol. 17, No. 6, 1981, pp. 305–316.

T. Munnecke, "*Give Your Computer an Ear For Names*", Byte Magazine (vol. 5, No. 5, May 1980), pp. 196–200.

S. J. P. Todd, *Abbreviated Typing for Word Processing*, IBM Tech. Disclos. Bulletin (vol. 21, No. 9, Feb. 1979) pp. 3796–3797.

GRAPHIC WORD SPELLING CORRECTION USING AUTOMATED DICTIONARY COMPARISONS WITH PHONETIC SKELETONS

BACKGROUND

This invention relates to an automated spelling correction method and apparatus which operates with a selected skeleton form of words, in lieu of processing words in the conventional graphic form of every-day printed matter. More particularly, the invention provides automated spelling correction which converts each misspelled word to a selected skeleton form, and processes the skeleton to find the correct spelling.

Spelling correction with word skeletons according to the invention has many advantages, including the capability for successfully correcting nearly all misspellings, including those with multiple errors, and with high speed operation. The practice of the invention simplifies and further speeds up spelling correction because it produces an unusually small number of correct suggestions from which the user is to select the correct replacement for any given misspelled word. In many instances it produces only a single correct replacement.

Word processors commonly have a spelling verifier, which is a system for identifying misspelled words. However, the automated correction of a misspelled word, once it is identified, is a far more difficult task than simply identifying the misspelling. One leading spelling corrector currently marketed for word processors typically presents a user with five to seven suggestions to replace one faulty word. This relatively large number of suggested correct words delays the user, who must consider each candidate within the context of the text being prepared. Another problem is to correct a high percentage of misspellings, or otherwise the user incurs further delay to perform a manual dictionary look-up in the event the automated correction fails.

The prior art regarding spelling correction includes the disclosures in U.S. Pat. Nos. 3,969,968 and 4,355,371. Also of interest is the disclosure in U.S. Pat. No. 3,995,254 regarding word verification.

Objects of this invention are to provide improved automated spelling correction suitable for use on a word processor, and more particularly to provide a method and apparatus for automated spelling correction which can correct all but few misspellings and which operates with sufficient high speed for convenient on-line use and operator interaction.

Another object is to provide such a spelling correction method and apparatus which produces only a small number of correctly-spelled suggestions to replace a misspelled word, and which hence requires minimal user decisions and correspondingly requires few user operations.

A further object of the invention is to provide spelling correction of the above character which is suitable for use with different languages and, further, which can readily be implemented with programmable digital computers of the types used in present day word processing equipment.

Other objects of the invention will in part be obvious and will in part appear hereinafter.

GENERAL DESCRIPTION

A spelling correction system according to the invention operates on a skeletized form of words. That is, the system has a data base of correctly spelled words both in conventional graphic form and in skeletized form. The system converts a misspelled word to a like skeletized form as the first step in processing that word to find the corresponding correctly spelled word.

The system converts a graphic word to a corresponding word skeleton in a manner that reduces each word to a selected set of linguistically salient features. One property of the conversion of a word to a skeleton which the invention provides is that it anticipates spelling errors. Spelling errors commonly stem from a lack of correspondence, i.e. a lack isomorphy, between the every day or graphic form of a word and the phonetic, spoken form of that word. As one example, the following four words all have the same phonetic long "e" sound in the second syllable, but represent that sound with four different spellings: "proceed", "precede", "receive" and "believe".

In the English language, discrepancies between the graphic and the phonetic forms of words arise in part from the spelling of unstressed vowels, the spelling of stressed long vowels and of some short stressed vowels, the spelling of single and of double consonants, and the spelling of silent vowels and of silent consonants. Other such discrepancies stem from different historical origins for words. This factor, for example, gives rise to different pronunciations of the same letters. One example of this discrepancy occurs with the three different pronunciations of the letters "ch" in the three words "chronic", "cheat" and "chauffeur".

The system which this invention provides for converting a graphic word to a word skeleton anticipates and thereby resolves many of the foregoing discrepancies. One skeleton-forming process which this invention provides discrepancy-anticipating property by reducing, simplifying or even eliminating the parts of the word which embody the discrepancy. For example, the four words "proceed", "receive", and "believe" noted above are converted to skeletons by eliminating the troublesome letters "ee", the penultimate "e" and the terminal "e", "ei" and "ie", respectively. The system instead relies on other, more salient, parts of each word to identify its unique, distinguishing pattern of alpha characters, i.e. letters.

A related property with which the present system forms the skeleton of a word is to retain in the skeleton only those letters which are more important for recognizing the unique pattern of that word.

Another property of a skeleton-forming process of the invention is to provide more linguistic distinctions in the skeleton of a short word than in the skeleton of a long word. The embodiment described below provides a four-way linguistic distinction for vowel sounds in short words; namely front, back, long, and short, but employs only a two-way, i.e. front and back, vocalic distinction for long words. More than two distinctions are deemed undesirable for long words because the added distinctions may interfere with the correction of certain misspellings. The two distinctions selected have been found sufficient, with other structure of long words, to characterize the word skeleton sufficiently so that the correction system does not produce an undue number of correctly-spelled suggestions. In short words, on the other hand, the stated four distinctions provide a finer initial differentiation as is desirable to enable the system to produce only a small number of correctly-spelled suggestions for correcting the misspelling.

A further property of the word skeletizing process of the invention is that many steps of the conversion are conjunctively ordered. The ouput from one such step is the input to a subsequent step in the skeletizing process. Other steps, however, are complimentary, i.e. disjunctive, and may be applied in different sequential orderings.

The formation of a word skeleton according to the invention is further characterized by the use of context-sensitive steps. These steps process parts of a word selectively, depending on such word-context factors as position in the word, letters, and the following letters.

A spelling correction system according to the invention converts a misspelled word to a linguistically salient skeleton in a manner as just described, and compares that skeleton to a data base of like skeletons prepared from a dictionary of correctly spelled words. In the event of a match, the system suggests to the user the graphic form of the word or words to which the selected dictionary skeleton corresponds.

If the user rejects the suggestion, or if there is no match, the system modifies the skeleton of the misspelled word and tests for a match, and makes a further modification and tests again, until a match is found or until the system halts. The procedures for modifying the skeleton, in the event no suitable match is found, generally involve disjunctive steps. Further, each modification is typically applied independently to the skeleton. The skeleton modifications hence preferably are ordered to apply first those modifications which statistically are most likely to result in a match.

A spelling correction system which implements the foregoing features corrects an unusually high percentage of misspellings. In addition, it operates with high time-efficiency, both with regard to the automated operation and with regard to the user interaction. Further, the logic of the spelling correction system has been implemented for the English language, but is of a type that can be applied to other languages which use alphabetic writing.

The system corrects cognitive spelling errors, i.e. errors resulting from a user's ignorance of how to spell a word, and corrects typographical errors, whether resulting from hitting the wrong sequence of keys or from omitting particular letters. The emphasis of the system, however, is on the correction of cognitive errors, since the user finds these errors more difficult and time-consuming to correct. A further advantage of the system is that it requires relatively little computer memory, in relation to the high speed and the high level of correction it attains.

The invention thus provides automated spelling correction with advantages in terms of a high percentage of misspellings it can correct, comparatively high speed of operation, and a low number of suggestions to replace a misspelled word. Specifically, one practice of the invention produces a single correct suggestion in the course of correcting, on the average, four out of every five misspellings. Further advantages are relative ease in preparing the instructions of a computer program for implementing the invention, and a relatively small computer memory size to store and run the system.

Yet another advantage is that the spelling correction system of the invention can be practices with different numbers of skeletizing steps, depending on the desired level of misspellings that are to be corrected, the number of suggestions produced for correcting each misspelling, the available memory capacity, and the speed of operation.

One indication of the accuracy of the spelling correction system of this invention is that it properly corrects in excess of 99% of all errors in the 5,480 misspelled words contained in the *Random House Bad Speller's Dictionary*. The Random House book contains both cognitive errors and typographical ones, although the former predominate. Moreover, the spelling correction system of the invention corrected more than 97% of all errors in a further list of 735 common misspellings, most of which are typographical.

The invention accordingly comprises the several steps and the relation of such steps to each of the others as exemplified in the process hereinafter set forth, and further comprises the apparatus for carrying out such steps and embodying the features of construction, combination of elements and arrangement of parts exemplified in the following detailed disclosure, and the scope of the invention is indicated in the claims.

Considering the invention in further detail, one process which the system of this invention applies in forming a word skeleton, to implement the foregoing properties and features, is replacing an alpha set with a different alpha set. The term "alpha set" is used herein with reference to a set of one or more alpha characters. An example of this set-replacing process is to replace "ph" with "f".

Another such process is replacing an alpha set with a non-alpha symbol. An example of this step is to replace the final "ie" sequence in a word of four alpha characters or more with a vocalic symbol designated "Y".

A third such process which the invention employs is removing an alpha set. An example of this step is the deletion of certain vowels.

More specifically, one step which the system performs is to drop a silent letter. An example of this step is to replace "rh" with "r". Another specific step is to replace multiple spellings which have a single sound with a single alpha set. An example of this step is to rewrite certain instances of both "si" and "ti" as "sh", particularly in the word endings "-sion" and "-tion".

A further specific step is to replace spellings that result in different sounds with appropriate different alpha sets. An example of this step is to retain the letter "z" at the beginning of a word, but to replace other instances of the letter "z" with "s".

As detailed hereinafter, and by way of specific example, a combination of steps of this nature deal with different instances of the letter "c". First every alpha set "tch" is rewritten as "kh". Second, every "c" when followed by "e", "i", or "y" is rewritten as "s". Finally, all other instances of the letter "c" are rewritten as the letter "k". One result of the third step together with the first step is that every instance of "tch" and of "ch" in a graphic word is converted to "kh" in the word skeleton. Note that in this example, the order of steps one and two may be reversed, but both must preceed the third step.

In the event of a misspelling of "ch" such that the skeleton formed in this way does not match a dictionary-derived, reference, skeleton, the former skeleton is modified and the modified skeleton tested for a match with the set of reference skeletons. The preferred skeleton modification of the invention resorts to rote, i.e. brute force, techniques only after executing a set of linguistically-based modifications. The preferred linguistic modifications deal, among other things, with "ch" misspellings, including by replacing "k" with "kh", and, if that fails to yield a match, by replacing "kht" with "sht".

Further in accordance with the invention, the system deals with vowel sets by first rewriting certain phonetically important vowel sets with other vowel sets, to attain ultimately vowel sets with fewer alpha characters than in the graphic alphabet. Other phonetically important vowel sets are rewritten with a vocalic symbol. The embodiment detailed below has five such symbols, designated "E", "I", "O", "W" and "Y". These symbols, each of which has a different phonetic sound, are designated with alpha characters partly for convenience due to available keyboard keys and partly for phonetic significance. However, they do not represent alpha characters in the graphic sense.

For short words, the symbol "E" represents a front long vowel, as occurs in "beet" and "bait". The symbol "O" represents a back long vowel, as in "move" and "raw". The symbol "I" represents a "front short" vowel, as in "bit" and "bet". The symbol "W" represents a "back short" vowel as in "cot" and "but". The system illustrated herein uses the same symbols "E" and "O" with reference to long words to represent, respectively, front and back vocalic sounds.

The illustrated system uses the symbol "Y" to represent two linguistic functions. One function is the phonetic sound of alpha sets such as "y", "ie" and "i" at the end of a word. The other is the intervocalic glide function of the letter "y" when between two other vowels, as occurs in "payable".

The processing of vowel sets of lesser significance rewrites them with a generic vowel symbol which has no phonetic significance other than to designate a vowel location or position in a word, as contrasted to a consonant set. This generic symbol is termed a "trace" and is designated as "_".

The final sequential step for dealing with vowel alpha sets is to eliminate those remaining after performing the foregoing steps. As evident in the preceding discussion, a linguistically salient word skeleton includes symbols representative of both the phonetic content and the alphbetic content of a word and, further, represents the linguistically salient features of the entire word in a manner which distinguishes the skeleton from like skeletal representations of other words.

BRIEF DESCRIPTION OF THE DRAWING

For a fuller understanding of the nature and objects of the invention, reference should be made to the following detailed description and the accompanying drawing, in which.

DESCRIPTION OF ILLUSTRATED EMBODIMENT

Figure 1:
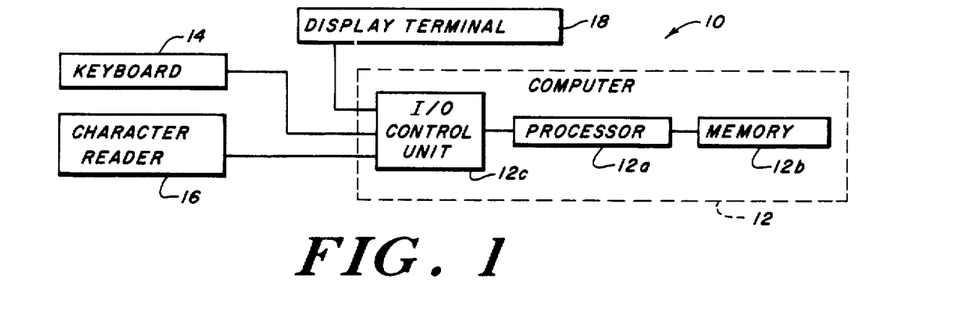
FIG. 1 is a block schematic diagram of components of a word processing system for implementing spelling corection in accordance with the invention.

A word processing system for practice of the invention typically has a conventional configuration as appears in FIG. 1. The illustrated system 10 has a stored programmed digital computer 12 which includes a central processing unit 12a connected with a random access memory 12b and with an input/output control unit 12c. Any of numerous commerically available programmable digital computers can be used, and a preferred illustrative one is a DEC VAX computer.

A user enters text, commands and other data to the computer 12 by way of a keyboard 14 and, optionally, with an optical character reader 16, both of which are connected with the peripheral control unit 12c. The system displays the text being processed, including misspelled words to be corrected, and the one or more suggestions it produces for correcting each misspelling, on a CRT display terminal 18.

Figure 2:
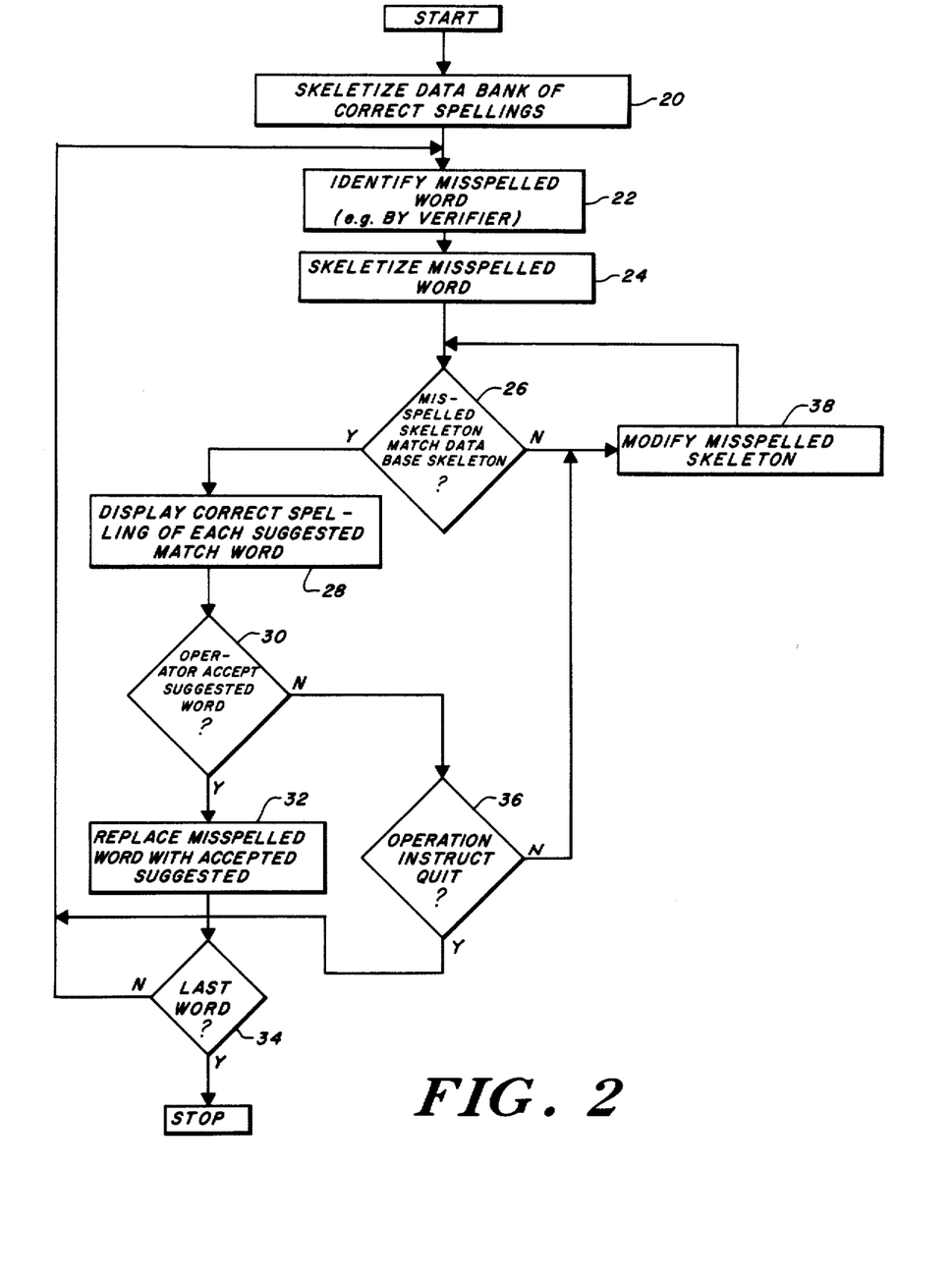
FIG. 2 is a flow chart of one spelling correction sequence according to the invention.

The word processing system 10 of FIG. 1 corrects spelling with an operating sequence shown in FIG. 2. The first action in this illustrated sequence, summarized in the flow chart with action 20, is to store in the memory 12b a data bank of correctly spelled words. The words are stored in both graphic form and in skeleton form. The system forms the word skeletons in the manner described above and preferably with the specific steps detailed below.

The next operation, indicated with action 22, is to identify a misspelled word that is to be corrected. The word processing system 10 typically performs this operation by using an automated spelling verifier, several of which are commerically available.

The first step in correcting the identified misspelled word is, as designated with action 24, to skeletize the misspelled word. The illustrated system does this with the same skeletizing steps applied in skeletizing the data bank, action 20. The illustrated operating sequence next performs a match decision 26 by testing whether the skeleton of the misspelled word matches the skeleton of any word in the data bank. In the event of an affirmative decision, i.e. upon the occurrence of a match, the operation advances to action 28 and the system displays on the CRT terminal 18 the correct graphic spelling of the word or words of the designated data bank entry. The next operation is a decision involving interaction with the operator, namely decision 30, to determine whether the operator accepts the suggested word or one of the suggested words. An affirmative decision advances the operation to action 32, where the system replaces the identified misspelled word in the text being edited with the accepted suggestion. The next operation is a decision 34 which determines if the last misspelled word has been corrected, i.e. whether the text is complete. An affirmative decision leads to the end of the operating sequence. A negative decision returns the operation to repeat the operating sequence commencing with action 22, i.e. to identify the next misspelled word and to correct it.

With further reference to FIG. 2, in the event the operator does not accept the suggestion, i.e. in the event of a negative response to decision 30, the next operation is decision 36, wherein the operator can instruct the system to quit the correcting effort for the designated misspelled word. An affirmative decision ends the operation for this particular word. The illustrated sequence returns to action 22, to identify the next misspelled word.

A negative result from decision 36, as well as a negative result from the match decision 26, advances the operation to action 38, which calls for the system to modify the skeleton of the misspelled word. The modification can include numerous procedures, one of which is to delete one alpha character or one symbol from the skeleton at a time. As the flow chart of FIG. 2 indicates, after each such skeleton-modifying iteration, the illustrated system tests the modified skeleton to determine the presence of a match, decision 26. A negative result leads to a further modification, with action 38. Another form of skeleton modification is to permute two adjacent characters or symbols of the skeleton, and a further sequence for skeleton modification is to insert every possible consonant in each possible place in the skeleton. Each of these skeleton-modifying actions is typically executed one at a time, and preferably with a sequence or order selected, as upon statistical analysis, to lead most expeditiously to a match.

More particularly, a preferred skeleton modification sequence for this spelling correction system first modifies the skeleton of the misspelled word according to a linguistically-corrective sequence of symbol changes, including insertions. These modifications are termed linguistically-corrective because they anticipate known spelling errors and the effect they have on the described word skeleton. The modifications hence are structured to resolve those misspelling which the unmodified skeleton of that misspelling does not correct. Further, the modifications preferably are sequentially ordered according to the statistical frequency of the targeted misspellings. The modifications of the skeleton can be structured to be applied to the original skeleton independently, i.e. one at a time, or with selected progression. A preferred pattern of the linguistically-corrective skeleton modifications first replaces one of the four vocalic symbols "I", "E", "O", "W" with one of the others, and replaces selected combinations of these symbols and the letter "r" with other such combinations. The pattern then proceeds to replace sets of one or more consonants, both with and without a vocalic symbol, with other such sets.

The annexed Attachment I presents one example of this preferred skeleton-modifying sequence.

SKELETON-FORMING INSTRUCTION SET

A preferred set of computer program rules or instructions for forming the word skeleton of a correctly spelled word for the data bank and the skeleton of an identified misspelling, is set forth below. Lower case letters in this program are alpha characters of the English language, "E", "I", "O", "W" and "Y" are linguistic vocalic symbols; and "_" is a trace and represents a generic non-phonetic vocalic symbol.

The instruction set uses the following definitions:
position: each letter in the word occupies a numbered position, starting with one for the left most position, i.e. the first letter of the word.
word-initial: the letter occupying position one is the word-initial.
word boundary: the end of the word is marked by the symbol "#", which immediately follows the last letter in the word.
word-final: word-final position is defined as the position immediately preceeding #.
Every "c" followed immediately by "e", "i", or "y" is rewritten as "s".
Every non-word-initial "z" is rewritten as "s".
Every "qu" sequence is rewritten as "kw".
Word-initial "wr" sequences are rewritten as "r".
All sequences of "wh" are rewritten as "w" when followed immediately by "e", "i", "a", or "y".
Every "tch" sequence is rewritten as "kh"
Sequences of "tu" are rewritten as "kh" when followed by a single occurrence of "r", "n", "m", or "l" which is followed by "e", "a", "i", "o", or "y". Position restrictions: This operation does not apply to sequences beginning in position one or position two of the word.
Sequences of "tu" are rewritten as "kh" when followed by "o", "a", or "e". The letter "o", "a", or "e" in this sequence is then rewritten as "o". Position restrictions: This operation does not apply to sequences beginning in position one or position two.
Word-final "y" is rewritten as "Y". Position restrictions: This operation does not apply to words of less than three letters.
Word-final "ie" sequences are rewritten as "Y". Position restrictions: This operation does not apply to words of less than four letters.
Word-final "i" is rewritten as "Y". Position restrictions: This operation does not apply to words of less than three letters.
Every intervocalic "i" or "y" is rewritten as "Y". In other words, every "i" that is both preceded and followed by any member of the set "e, i, o, a, u" is rewritten as "Y".
Every "y" that is immediately preceded by a consonant (a member of the set "t, n, r, s, h, d, l, c, f, m, p, g, b, v, w, x, q, j, z") is rewritten as "i".
Sequences of "si" and "ti" are rewritten as "sh" when followed immediately by "a", "o", or "u". Position restrictions: This operation does not apply to sequences beginning in position one or position two.
Word-final sequences of "gue" are rewritten as "ge". Position restriction: This rule does not apply to sequences beginning in position one or position two.
Every remaining "ue" sequence is rewritten as "oo".
Sequences of "e", "a", or "o" followed by "u" or "w" are rewritten as "oo" when followed by a consonant (member of the set "t, n, r, s, h, d, l, c, f, m, p, g, b, v, k, x, q, j") or when word-final.
Word-final sequences "ea" and "ia" are rewritten as a trace ("_"). Position restrictions: This operation does not apply to words of less than four letters.
All word-initial vowels or (word-initial) sequences of vowels (members of the set "a, e, i, o, u") are rewritten as a trace ("_").
Every "dg" sequence is rewritten as "g".
Every remaining "c" is rewritten as "k".
Every sequence of two or three identical consonants (members of the set "t, n, r, s, h, d, l, f, m, p, g, b, v, w, y, k, x, q, j") is rewritten as a single consonant.
Every "ks" sequence is rewritten as "x".
Sequences of "xion" are rewritten as "xhon". Position restriction: This operation does not apply to word-initial sequences.
Word-initial "ps" sequences are rewritten as "s".
Every "rh" sequence is rewritten as "r".
Non-word-initial sequences of "ght" are rewritten as "te".
Every "ph" sequence is rewritten as "f".
Every "gn" sequence is rewritten as "n".
Word-initial sequences of "kn" or "pn" are rewritten as "n".
Every "xs" sequence is rewritten as "x".
The letters "e", "i", and "a" are rewritten as "E" when preceded exclusively by consonants or preceeded by the trace of word-initial vowels followed exclusively by consonants.

The letters "o" and "u" are rewritten as "O" when preceded exclusively by consonants or preceeded by the trace of word-initial vowels followed exclusively by consonants.

The symbol "E" is rewritten as "O" when it is followed by a single "r" which is followed by any other consonant (member of the set "t, n, s, d, l, f, m, p, g, b, v, k, k, q, j, z") or a boundary. Position restriction: This operation does not apply to letters in word-initial position.

Word-final "o" is rewritten as "O". Position restriction: This operation applies only to words of two or more letters.

Word-final "oe" sequences are rewritten as "O". Position restriction: This operation applies only to words of two or more letters.

The symbol "E" is rewritten as "I" when it is followed exclusively by consonants (i.e., when it is the only vowel in the word).

The symbol "O" is rewritten as "W" when it is followed exclusively by consonants (i.e., when it is the only vowel in the word).

Every remaining "a", "e", "i", "o", "u", and "y" is deleted. Position restriction: This operation does not apply in word-initial position.

The foregoing instruction set, when stored in suitably coded form in the FIG. 1 memory 12b, causes the computer 12 of the word processor 10 to form word skeletons in action 20 and in action 24 for the operating sequence which FIG. 2 shows. The detail programming of the computer 12 to execute the illustrated operating sequence, including the conversion of graphic words to word skeletons according to the foregoing illustrated instruction set, is well within the skill of a programmer skilled in this art and accordingly is not described further. A complete object code listing of a spelling corrector as described herein, including with the foregoing instruction list, and for operation on an IBM 4341 computer is set forth in Attachment II hereto.

The foregoing instruction set is illustrative and may be modified. By way of non-limiting examples, the number of steps in the set can be changed. Additional steps may increase the percentage of misspellings which are corrected and may decrease the number of suggestions which the system produces for correcting a misspelling. A corrector having a lesser number of steps, as by eliminating steps that deal with vowels, may have the opposite result but can operate in a computer having less memory capacity. Another modification of the illustrated instruction set is to change the sequence of certain steps that are disjunctive. For example, the requested order of the first four steps of the illustrated set can be changed at will.

Figure 3:
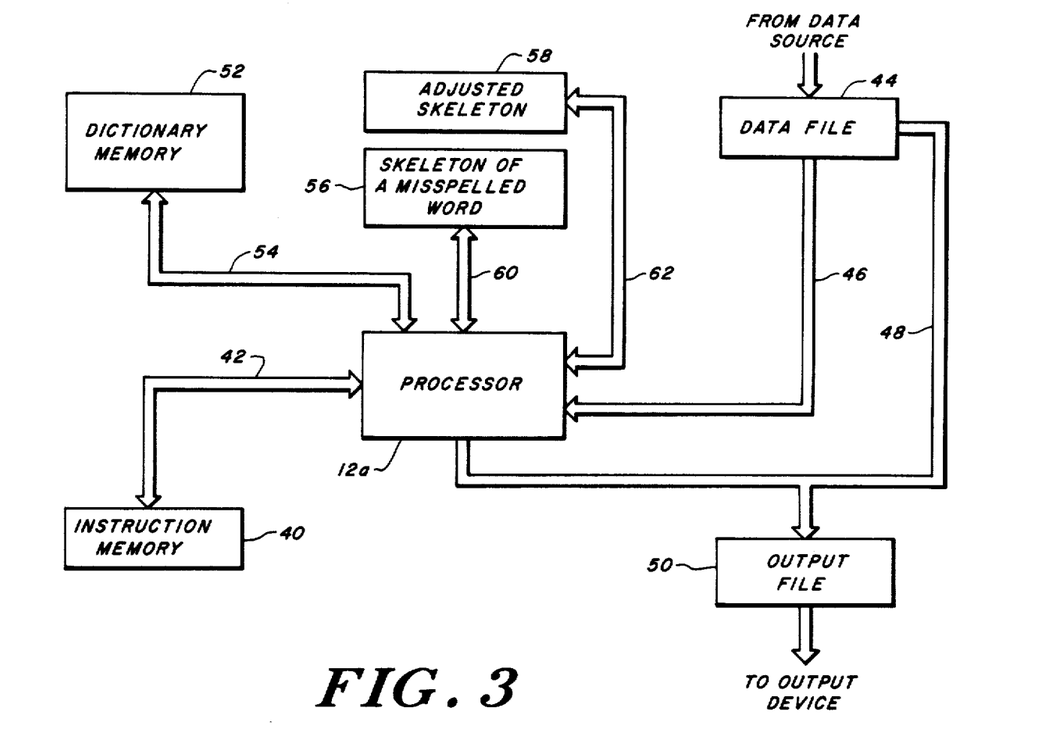
FIG. 3 is a block diagram of some elements of the system components shown in FIG. 1.

FIG. 3 shows the operative arrangement of the FIG. 1 computer 12, and particularly including the processor 12a and the memory 12b, for operating according to the flow chart of FIG. 2. The processor 12a includes the central processing and control unit of the computer 12. The memory 12b of the computer includes an instruction memory 40 which stores instructions which control the system operation and is in two-way communication over a bus 42 with the processor 12a. A data file 44 of the memory element typically stores text being edited or otherwise processed and hence stores the misspellings to be corrected. In the illustrated arrangement, the data file 44 communicates data to the processor 12a on a bus 46 and receives data from the processor by way of bus 48. An output file 50 of the memory 12b stores corrected text available for an output device, for example, to display on the FIG. 1 display terminal 18 and to print on a printer (not shown). The output file 50 illustratively receives data from the processor 12a by way of the bus 48.

Another portion of the memory 12b is termed a dictionary memory 52 and stores the dictionary set of correctly spelled words, both in graphic form and with the word skeleton of each dictionary word. The dictionary memory is in two-way communication with the processor 12a by way of bus 54.

FIG. 3 shows the computer 10 with two further memory elements, one of which is a register 56 for storing the skeleton of a designated word to be corrected, and the other is a register 58 which stores a modified skeleton of the designated word to be corrected. Each register 56 and 58 is in two-way communication wfth the processor 12a, illustratively by way of buses 60 and 62, respectively.

The operation of the computer 12 as illustrated in FIG. 3 includes the entering of source data such as text to be edited to the data file 44 from a data source such as the FIG. 1 keyboard 14. This data entry may be under the control of the processor 12a, or, for example, may be performed with direct memory access. The processor 12a identifies a misspelled word in the data file 44, typfcally by execution of a verifier program also stored in the instruction memory 40, and accesses that misspelled word from the data file. The processor converts the designated word to a word skeleton in the manner described hereinabove, and stores the skeleton in the memory register 56. The processor 12a converts the designated word to a word skeleton with programmed instructions stored in the instruction memory 40. The processor 12a employs the identical skeleton-forming instructions to enter into the dictionary memory 52, at a prior time, the word skeleton corresponding with each graphic word in the dictionary set which the dictionary memory 52 stores.

Under further program instruction from the instruction memory 40, the processor 12a compares the word skeleton in register 56 with the dictionary set of skeletons in the dictionary memory 52. Upon finding a match between the skeleton in the register 56 and a dictionary skeleton, the processor accesses in the dictionary memory 52 the graphic word or words which correspond to the dictionary skeleton which matches the skeleton of the word designated for correction. This corrective set of one or more correctly-spelled graphic words is transferred by the processor 12a to the output file 50, typically for display to the operator by way of the display terminal 18 of FIG. 1.

Upon acceptance of one word from the corrective set by the operator, the processor 12a enters in the output file 50 the designated correct graphic word and, typically, enters further text from data file 44 up until the next misspelling. Upon identifying the next misspelling in the data file 44, the computer repeats the foregoing operations to correct it.

In the event the processor 12 does not identify a match between the word skeleton in register 56 and a dictionary skeleton in the memory 52, or in the event the operator rejects every word in the corrective set, the processor 12a proceeds to modify the word skeleton in register 56 and store the modified skeleton in register 58. The processor 12a modifies the word skeleton for these operations in accordance with further instructions it accesses from the instruction memory 40. The processor 12a in the illustrated sequence makes one modification to the word skeleton in the register 56, compares the modified skeleton in register 58 with the dictionary set of word skeletons, and in the event no match is found, again modifies the word skeleton in register 56 and executes another match test. The computer 12 repeats this sequence of skeleton modifications and match tests until an acceptable match is determined or the system otherwise halts.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings be interpreted as illustrative and not in a limiting sense. It is also to be understood that the following claims are intended to cover all of the generic and specific features of the invention herein described, and all statements of the scope of the invention which, as a matter of language, might be said to fall therebetween.

ATTACHMENT I
Skeleton Modifying Sequence

| Take | Substitute |
|------|------------|
| E | I |
| O | W |
| I | E |
| W | O |
| rI | Wr |
| Wr | rE |
| E | O |
| O | E |
| W | I |
| I | W |
| rE | Or |
| Er | rO |
| I | O |
| Wr | Er |
| Or | rO |
| Or | rE |
| E | Or |
| fs | vs |
| k | kh |
| rmnt | rmnt |
| rt | rkt |
| mt | mpt |
| g | gh |
| Of | Ogh |
| j | g |
| g | j |
| nb | mb |
| np | mp |
| nf | mf |
| sm | sthm |
| sh | kh |
| kht | sht |
| Ed | Et |
| Od | Ot |
| jl | dl |
| sh | s |
| sh | t |
| rE | rE |
| k | kw |
| kY | kw |
| kY | kwt |
| Y | t |
| j | dj |
| Wf | Ogh |
| gs | x |
| sl | stl |
| khr | tr |

ATTACHMENT I
Skeleton Modifying Sequence

| Take | Substitute |
|------|------------|
| khn | tn |
| sh | xh |
| tn | shn |
| Ik | Es |
| kn | n |

Having described the invention, what is claimed as new and secured by Letters Patent is:

1. A process for the automated spelling correction of a graphic word, said process comprising the steps of
    A. converting each graphic word of a machine-stored and machine-readable dictionary set of correctly spelled words to a specified linguistically salient word skeleton and storing also the resultant set of word skeletons,
    B. converting a designated word from a conventional graphic representation to said specified linguistically salient word skeleton and storing the resultant word skeleton,
        each said converting step comprising the steps of
        (i) omitting from the word skeleton produced thereby a selected alpha set, if any, of the word being converted which lacks isomorphy with a phonetic representation of that selected set, and
        (ii) replacing with a different linguistic symbol another selected alpha set, if any, of the word being converted which lacks isomorphy with a phonetic representation of that other selected set,
    C. comparing said skeleton of said designated word with said dictionary set of word skeletons,
    D. responding to a match from said comparison of word skeletons and producing from the matching skeleton of said dictionary set a corrective set of one or more corresponding grapic words of said dictionary set, and
    E. producing a visual display of said corrective word set.

2. A process according to claim 1 in which each said converting step produces a word skeleton having lesser linguistic discrepancy from a phonetic representation of the word being converted than the graphic form of that word has.

3. A process according to claim 1 comprising the further steps of
    A. responding to the absence of a selected match from said comparison of word skeletons and modifying said skeleton of said designated word,
    B. comparing said modified skeleton with said dictionary set of word skeletons, and
    C. repeating said modifying step and said modified-skeleton comparing step selectively in response to the continued absence of said selected match.

4. A process according to claim 1 in which said converting steps include the steps of selectively providing a four-way vocalic distinction in the skeleton of a short word and selectively providing only a two-way vocalic distinction in the skeleton of a long word.

5. A process according to claim 4 in which said converting steps include the further step of classifying a word having only a single set of one or more contiguous vowels, other than a silent final vowel, as a short word.

6. In a process for automated spelling correction by the comparison of a graphic word to be corrected with a dictionary set of correctly spelled words to produce a corrective set of one or more dictionary words selectively matching the designated word, the improvement comprising the steps of
   A. producing from the designated word in conventional graphic representation, by a first transformation, a designated-word skeleton representing linguistically-salient phonetic features of that word, said transformation comprising the steps of
      (i) omitting from the skeleton produced thereby a selected alpha set, if any, of the word being converted which lacks isomorphy with a phonetic representation of that selected set, and p2 (ii) replacing with a different linguistic symbol another seleted alpha set, if any, of the word being converted which lacks isomorphy with a phonetic representation of that other selected set,
   B. effecting said comparison by comparing said designated-word skeleton with a set of dictionary-word skeletons, each skeleton of which corresponds to one said correctly-spelled word and which represents linguistically-salient features of that word according to said same first transformation, and
   C. selecting from said dictionary set of words the one or more words which correspond to the dictionary-word skeleton which exactly matches the designated-word skeleton, thereby to produce said corrective set of words.

7. In automated spelling according to claim 6, the further improvement comprising the steps of
   A. selectively modifying, in response to the absence of an acceptable match of skeletons, said designated-word skeleton by replacing one set of one or more skeleton symbols with a different set of such symbols,
   B. repeating said comparing step with the midified skeleton, and
   C. selectively repeating said modifying step and said compare-repeating step in response to the continued absence of an acceptable match of skeletons.

8. In apparatus for automated spelling correction by the comparison of a graphic word to be corrected with a dictionary set of correctly spelled words to produce a corrective set of one or more dictionary words selectively matching the designated word, the improvement comprising,
   A. means for producing from the designated word in conventional graphic representation, by a first transformation, a designated-word skeleton representing linguistically-salient phonetic features of that word, said transformation means comprising means for
      (i) omitting from the skeleton produced thereby a selected alpha set, if any, of the word being converted which lacks isomorphy with a phonetic representation of that selected set, and
      (ii) replacing with a different linguistic symbol another seleted alpha set, if any, of the word being converted which lacks isomorphy with a phonetic representation of that other selected set,
   B. means for effecting said comparison by comparing said designated-word skeleton with a set of dictionary-word skeletons, each skeleton of which corresponds to one said correctly-spelled word and which represents linguistically-salient features of that word according to said same first transformation, and
   C. means for selecting from said dictionary set of words the one or more words which correspond to the dictionary-word skeleton which exactly matches the designated-word skeleton, thereby to produce said corrective set of words.

9. In apparatus for automated spelling according to claim 8, the further improvement comprising
   A. means for selectively modifying, in response to the absence of an exact match of skeletons, said designated-word skeleton by replacing one set of one or more skeleton symbols with a different set of such symbols,
   B. means for repeating said comparing step with the modified skeleton, and
   C. means for selectively repeating said modifying step and said compare-repeating step in response to the continued absence of an exact match of skeletons.

10. Apparatus for the automated spelling correction of a graphic word, said apparatus comprising
    A. means for converting each graphic word of a machine-stored and machine-readable dictionary set of correctly spelled words to a specified linguistically salient word skeleton and for storing also the resultant set of word skeletons, and for convertins a designated word from conventional graphic representation to said specified linguistically salient word skeleton and for storing the resultant word skeleton, said converting means comprising
       (i) means for elimating from the word skeleton produced thereby a selected alpha set, if any, of the word being converted which lack isomorphy with a phonetic representation of that selected set, and
       (ii) means for replacing with a different linguistic symbol another selected alpha set, if any, of the word being converted which lacks isomorphy with a phonetic representation of that other selected set,
    B. means for comparing said skeleton of said designated word with said dictionary set of word skeletons,
    C. means for responding to a match from said comparison of word skeletons and for producing from the matching skeleton of said dictionary set a corrective set of one or more corresponding graphic words of said dictionary set, and
    D. means for producing a visual display of said corrective word set.

11. Apparatus according to claim 10 in which said converting means includes means for producing a word skeleton having lesser linguistic discrepancy from the phonetic representation of a word being converted than the graphic form of that word has.

12. Apparatus according to claim 10 further comprising
    A. means for responding to the absence of a match from said comparison of word skeletons and for modifying said skeleton of said designated word,
    B. means for comparing said modified skeleton with said dictionary set of word skeletons, and
    C. means for repeating said modifying operation and said modified-skeleton comparing operation selectively in response to the continued absence of said selected match.

13. Apparatus according to claim 10 in which said converting means includes means for selectively providing a four-way vocalic distinction in the skeleton of a short word and selectively providing only a two-way vocalic distinction in the skeleton of a long word.

14. Apparatus according to claim 13 in which said converting means includes means for classifying a word having only a single set of one or more contiguous vowels, other than a silent final vowel, as a short word.

15. A process according to claim 1 in which each said converting step further comprises the steps of
- (i) converting to an alpha set "s", an alpha set consisting of a character "c" followed immediately by any one of the characters "e", "i", and "y",
- (ii) converting to an alpha set "s", a non-word-initial alpha set "z",
- (iii) converting to an alpha set "kw", an alpha set "qu", and
- (vi) converting to an alpha set "r", a word-initial alpha set "wr".

16. A process according to claim 15 in which each said converting step further comprises sequential steps selected from the sequential steps of
- (i) converting to an alpha set "w", an alpha set "wh" which is followed immediately by any one of the characters "e", "i", "a", and "y",
- (ii) converting to an alpha set "kh", an alpha set "tch",
- (iii) converting to an alpha set "kh", an alpha set "tu" which
  - (a) is followed by a single occurrence of any one of the characters "r", "n", "m", and "l" which, in turn, is followed by any one of the characters "e", "a", "i", "o", and "y", and
  - (b) does not begin in character position one or in character position two of the word,
- (iv) converting to an alpha set "kho", an alpha set which
  - (a) consists of a character sequence "tu" followed by any one of the characters "o", "a", and "e", and
  - (b) which does not begin in character position one or character position two of the word being converted,
- (v) converting to a first non-alpha symbol, a word-final alpha set "y" which does not form a portion of a word having a character length less than three,
- (vi) converting to said first symbol, a word-final alpha set "ie" which does not form a portion of a word having a character length less than four,
- (vii) converting to said first symbol, a word-final alpha set "i" which does not form a portion of a word having a character length less than three,
- (viii) converting to said first symbol, an alpha set which
  - (a) consists of either of the characters "i" or "y", and
  - (b) is both preceded and followed by any one of the characters "e", "i", "o", "a", and "u",
- (ix) converting to an alpha set "i", an alpha set "y" which is immediately preceded by a consonant,
- (x) converting to an alpha set "sh", an alpha set which
  - (a) consists of either of the character sequences "si" or "ti",
  - (b) is followed immediately by any one of the characters "a", "o", and "u", and
  - (c) does not begin in character position one or character position two of the word,
- (xi) converting to an alpha set "ge", a word-final alpha set "gue" which does not begin in character position one or character position two of the word,
- (xii) converting to an alpha set "oo", an alpha set "ue",
- (xiii) converting to an alpha set "oo", an alpha set which consists of any one of the characters "e", "a", and "o" followed by either of the characters "u" or "w", and which
  - (a) is followed by a consonant, or
  - (b) is word-final,
- (xiv) converting to a trace symbol, a word-final alpha set which
  - (a) consists of either of the character sequences "ea" or "ia", and
  - (b) does not form a portion of a word having a character length less than four,
- (xv) converting to a trace symbol, a word-initial alpha set consisting of one or more occurrences any of the characters "a", "e", "i", "o", and "u",
- (xvi) converting to an alpha set "g", an alpha set "dg",
- (xvii) converting to an alpha set "k", an alpha set "c",
- (xviii) converting an alpha set consisting of either of a doubly-adjacent or triply-adjacent occurrence of a single consonant to an alpha set being said single consonant,
- (xix) converting to an alpha set "x", an alpha set "ks",
- (xx) converting to an alpha set "xhon", a non-word-initial alpha set "xion",
- (xxi) converting to an alpha set "s", a word-initial alpha set "ps",
- (xxii) converting to an alpha set "r", an alpha set "rh",
- (xxiii) converting to an alpha set "te", a non-word-initial alpha set "ght",
- (xxiv) converting to an alpha set "f", an alpha set "ph",
- (xxv) converting to an alpha set "n", an alpha set "gn",
- (xxvi) converting to an alpha set "n", a word-initial alpha set which consists of either of the character sequences "kn" or "pn", and
- (xxvii) converting to an alpha set "x", an alpha set "xs".

17. A process according to claim 16 in which each said converting step further comprises sequential steps selected from the sequential steps of
- (i) converting to a second non-alpha symbol, an alpha set which consists of any one of the characters "e", "i", and "a" and which is preceded by
  - (a) exclusively consonants, or
  - (b) a trace symbol, resulting from a prior-executed conversion step, which is followed exclusively by consonants,
- (ii) converting to a third non-alpha symbol, an alpha set which consists of either of the characters "o" or "u" and which is preceded by
  - (a) exclusively consonants, or
  - (b) a trace symbol, resulting from a prior-executed conversion step, which is followed exclusively by consonants,
- (iii) converting to said third symbol, a non-word-initial second symbol which results from a prior conversion step, and which is followed by a singly-occurring character "r" which
  - (1) is followed by a consonant not a character "r", or (2) is word-final,
(iv) converting to said third symbol, a word-final alpha set "o" which forms a portion of a word having a character length of two or more,
(v) converting to said third symbol, a word-final alpha set "oe" which forms a portion of a word having a character length of two or more,
(vi) converting to a fourth non-alpha symbol, a second symbol which results from a prior conversion step, and which is followed exclusively by consonants, and
(vii) converting to a fifth non-alpha symbol, a third symbol which results from a prior conversion step, which is followed exclusively by consonants,
(viii) deleting a non-word-initial alpha set consisting of one or more occurrences of any of the characters "a", "e", "i", "o", "u", and "y".

18. In apparatus according to claim 8, the further improvement in which said transformation means further comprises means for
(i) converting to an alpha set "s", an alpha set consisting of a character "c" followed immediately by any one of the characters "e", "i", and "y",
(ii) converting to an alpha set "s", a non-word-initial alpha set "z",
(iii) converting to an alpha set "kw", an alpha set "qu", and
(iv) converting to an alpha set "r", a word-initial alpha set "wr".

19. In apparatus according to claim 18, the further improvement in which said transformation means further comprises means for executing sequential operations selected from the sequential operations of
(i) converting to an alpha set "w", an alpha set "wh" which is followed immediately by any one of the characters "e", "i", "a", and "y",
(ii) converting to an alpha set "kh", an alpha set "tch",
(iii) converting to an alpha set "kh", an alpha set "tu" which
(a) is followed by a single occurrence of any one of the characters "r", "n", "m", and "l" which, in turn, is followed by any one of the characters "e", "a", "i", "o", and "y", and
(b) does not begin in character position one or in character position two of the word,
(iv) converting to an alpha set "kho", an alpha set which
(a) consists of a character sequence "tu" followed by any one of the characters "o", "a", and "e", and
(b) which does not begin in character position one or character position two of the word being converted,
(v) converting to a first non-alpha symbol, a word-final alpha set "y" which does not form a portion of a word having a character length less than three,
(vi) converting to said first symbol, a word-final alpha set "ie" which does not form a portion of a word having a character length less than four,
(vii) converting to said first symbol, a word-final alpha set "i" which does not form a portion of a word having a character length less than three,
(viii) converting to said first symbol, an alpha set which
(a) consists of either of the characters "i" or "y", and
(b) is both preceded and followed by any one of the characters "e", "i", "o", "a", and "u",
(ix) converting to an alpha set "i", an alpha set "y" which is immediately preceded by a consonant,
(x) converting to an alpha set "sh", an alpha set which
(a) consists of either of the character sequences "si" or "ti",
(b) is followed immediately by any one of the characters "a", "o", and "u", and
(c) does not begin in character position one or character position two of the word,
(xi) converting to an alpha set "ge", a word-final alpha set "gue" which does not begin in character position one or character position two of the word,
(xii) converting to an alpha set "oo", an alpha set "ue",
(xiii) converting to an alpha set "oo", an alpha set which consists of any one of the characters "e", "a", and "o" followed by either of the characters "u" or "w", and which
(a) is followed by a consonant, or
(b) is word-final,
(xiv) converting to a trace symbol, a word-final alpha set which
(a) consists of either of the character sequences "ea" or "ia ", and
(b) does not form a portion of a word having a character length less than four,
(xv) converting to a trace symbol, a word-initial alpha set consisting of one or more occurrences any of the characters "a", "e", "i", "o", and "u",
(xvi) converting to an alpha set "g", an alpha set "dg",
(xvii) converting to an alpha set "k", an alpha set "c",
(xviii) converting an alpha set consisting of either of a doubly-adjacent or triply-adjacent occurrence of a single consonant to an alpha set being said single consonant,
(xix) converting to an alpha set "x", an alpha set "ks",
(xx) converting to an alpha set "xhon", a non-word-initial alpha set "xion",
(xxi) converting to an alpha set "s", a word-initial alpha set "ps",
(xxii) converting to an alpha set "r", an alpha set "rh",
(xxiii) converting to an alpha set "te", a non-word-initial alpha set "ght",
(xxiv) converting to an alpha set "f", an alpha set "ph",
(xxv) converting to an alpha set "n", an alpha set "gn",
(xxvi) converting to an alpha set "n", a word-initial alpha set which consists of either of the character sequences "kn" or "pn", and
(xxvii) converting to an alpha set "x", an alpha set "xs".

20. In apparatus according to claim 19, the further improvement in which said transformation means further comprises means for executing sequential operations selected from the sequential operations of
(i) converting to a second non-alpha symbol, an alpha set which consists of any one of the characters "e", "i", and "a" and which is preceded by
(a) exclusively consonants, or
(b) a trace symbol, resulting from a prior-executed conversion step, which is followed exclusively by consonants, (ii) converting to a third non-alpha symbol, an alpha set which consists of either of the characters "o" or "u" and which is preceded by
   (a) exclusively consonants, or
   (b) a trace symbol, resulting from a prior-executed conversion step, which is followed exclusively by consonants,
(iii) converting to said third symbol, a non-word-initial second symbol which results from a prior conversion step, and which is followed by a singly-occurring character "r" which
   (1) is followed by a consonant not a character "r", or
   (2) is word-final,
(iv) converting to said third symbol, a word-final alpha set "o" which forms a portion of a word having a character length of two or more,
(v) converting to said third symbol, a word-final alpha set "oe" which forms a portion of a word having a character length of two or more,
(vi) converting to a fourth non-alpha symbol, a second symbol which results from a prior conversion step, and which is followed exclusively by consonants, and
(vii) converting to a fifth non-alpha symbol, a third symbol which results from a prior conversion step, which is followed exclusively by consonants,
(viii) deleting a non-word-initial alpha set consisting of one or more occurrences of any of the characters "a", "e", "i", "o", "u", and "y".

* * * * *

UNITED STATES PATENT AND TRADEMARK OFFICE
CERTIFICATE OF CORRECTION

PATENT NO. : 4,580,241

DATED : April 1, 1986

INVENTOR(S) : Henry Kucera

Page 1 of 3

It is certified that error appears in the above-identified patent and that said Letters Patent is hereby corrected as shown below:

On page 1 of the patent, left-hand column, in the title of the invention after "Phonetic" insert -- Word -- .

On page 1 of the patent, in References Cited: U.S. Patent Documents, before the line beginning "4,471,459 9/1984 Dickenson et al. ... " insert the line
    -- 4,435,617  3/1984  Griggs ............. 381/44 --.

Column 1, line 4, after "Phonetic" insert -- Word --.

Column 2, line 38, after " 'proceed', " insert -- "precede," --.

Column 5, line 55, replace "corection" with -- correction --.

Column 8, line 20, before "that" insert -- or "y" --.

Column 13, line 2, before "graphic" insert -- designated --.

Column 13, line 15, delete -- p2 --.

Column 13, line 38, replace "midified" with -- modified --.

Column 13, line 44, before "graphic" insert -- designated --.

UNITED STATES PATENT AND TRADEMARK OFFICE
CERTIFICATE OF CORRECTION

PATENT NO. : 4,580,241
DATED : April 1, 1986
INVENTOR(S) : Henry Kucera

It is certified that error appears in the above-identified patent and that said Letters Patent is hereby corrected as shown below:

Column 2, line 11, after "lack" insert -- of --.

Column 3, line 65, replace "practices" with -- practiced --.

Column 7, line 20, replace "misspelling" with -- misspellings --.

Column 7, line 65, after ' "kh" ' insert -- . --.

Column 9, line 1, replace "preceeded" with -- preceded --.

Column 9, line 4-5, replace "preceeded" with -- preceded --.

Column 10, line 20, replace "wfth" with -- with --.

Column 10, line 29, replace "typfcally" with -- typically --.

UNITED STATES PATENT AND TRADEMARK OFFICE
CERTIFICATE OF CORRECTION

PATENT NO. : 4,580,241
DATED : April 1, 1986
INVENTOR(S) : Henry Kucera

It is certified that error appears in the above-identified patent and that said Letters Patent is hereby corrected as shown below:

Column 13, line 17, replace "seleted" with --selected--.

Column 14, line 25, replace "convertins" with --converting--.

Signed and Sealed this

Twenty-third Day of September 1986

[SEAL]

Attest:

DONALD J. QUIGG

Attesting Officer

Commissioner of Patents and Trademarks